Nov. 15, 1938.   H. J. NYHUS   2,136,948
LOCKING DEVICE FOR AUTOMOBILE HOODS
Filed April 15, 1937
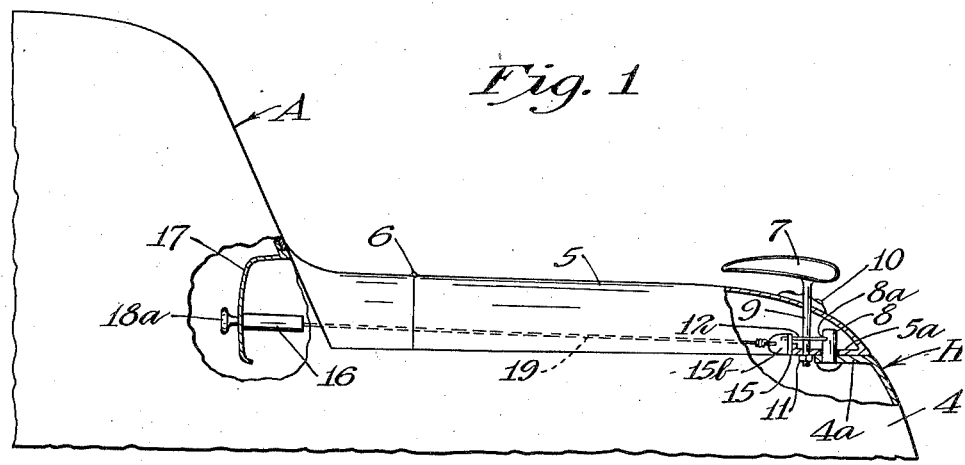
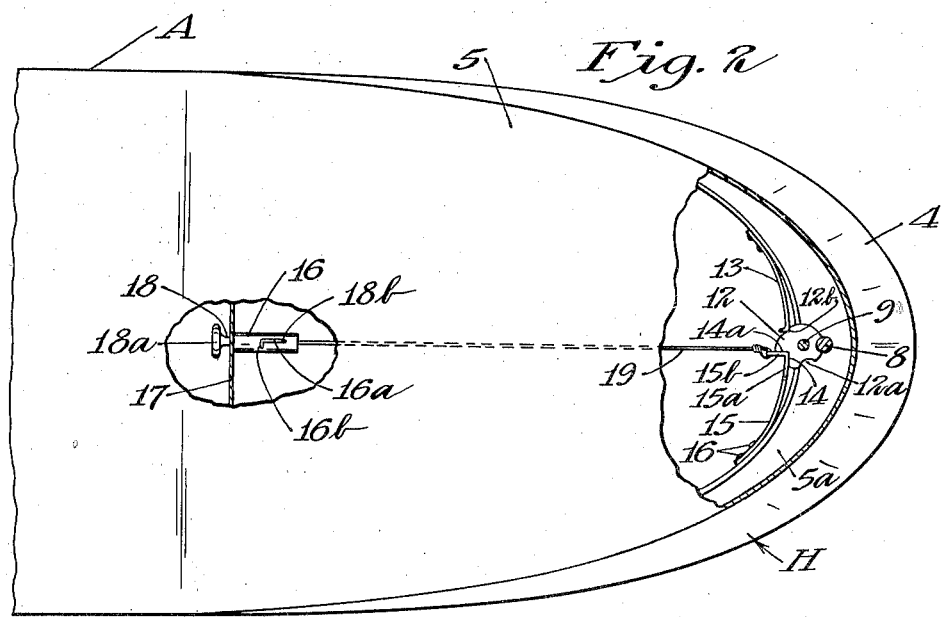
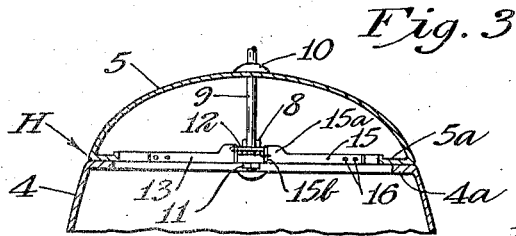
Inventor
Hilbert J. Nyhus
By Williamson + Williamson
Attorneys Patented Nov. 15, 1938

2,136,948

UNITED STATES PATENT OFFICE 2,136,948

LOCKING DEVICE FOR AUTOMOBILE HOODS

Hilbert J. Nyhus, Grand Forks, N. Dak., assignor of one-third to Earle L. Nyhus, Fargo, N. Dak., and one-third to John Tangen, Grand Forks, N. Dak.

Application April 15, 1937, Serial No. 137,016

4 Claims. (Cl. 292—210)

My invention relates to locking devices and particularly to locking devices for the hoods of automobiles.

In the modern automobile, many relatively easily detachable devices and engine accessories are housed by the hood of the vehicle and, in the absence of means for preventing unauthorized opening of the hood, are particularly susceptible to theft during times when the vehicle is parked in unprotected locations.

An object of my invention is to provide locking apparatus for normally preventing the releasing of an automobile hood latch through manipulation of the usual exteriorly accessible latch-operating handle and yet releasable by operation of a control element when it is desired that the latch be releasable responsive to manipulation of the exteriorly accessible handle.

Another object is to provide such apparatus so arranged as to enable complete housing of the same within the hood and body of an automobile so that said apparatus is not accessible for unauthorized operation thereof when the doors of the automobile are locked and whereby a key-controlled lock need not be included in the apparatus.

A further object is to provide such apparatus of light, simple, compact, reliable and inexpensive construction and permissive of easy and convenient operation thereof.

These and further objects and advantages of the invention will more fully appear from the following description made in connection with the accompanying drawing, wherein like reference characters refer to the same or similar parts throughout the views, and, in which:—

Fig. 1 is a partial side view of an automobile with an embodiment of my invention incorporated therein;

Fig. 2 is a partially broken away top view; and

Fig. 3 is a vertical cross-sectional view of the upper portion of the hood of the automobile shown in Fig. 1.

Referring to the drawing, I have shown an embodiment of my invention in operative relation with an automobile A having a hood H of the type wherein the main portion 4 is stationary and an upper portion 5 constitutes a lid hinged to stationary portions of the hood at 6 so as to be upwardly and rearwardly swingable for opening the hood H in an automobile having a hood of the type shown. The lid 5 is normally held in its downwardmost or closed position by means of a suitable latch operated by a handle 7 which has the appearance of and functions as a radiator ornament.

The lower part of the forward portion of the lid 5 is provided with a rearwardly projecting flange 5a extending into the interior space of the hood H. The upper part of the forward portion of the main hood member 4 is provided with a rearwardly projecting flange 4a projecting into the interior space of the hood H parallel to and closely adjacent the flange 5a when the lid 5 is in closed position. The usual form of latching means for the hood 5 is mounted in part on the flange 4a and in part on the flange 5a. An upstanding stud 8 is mounted on the flange 4a and projects upwardly through a suitable aperture in the flange 5a to a point somewhat above the flange 5a. The rear side of the stud 8 is provided with a groove 8a formed therein. The operating handle 7 is mounted on the upper end of a shaft 9 which is journaled in aligned apertures respectively located in a plate 10 secured to the upper side of the lid 5 and in the flange 5a of the lid 5. A suitable retaining element 11 is secured to the lower end of the shaft 9 to restrain the same from upward displacement. The shaft 9 carries a disc 12 secured thereon at the level of the groove 8a in the stud 8 and the diameter of the disc 12 is such that the marginal portion of the disc is received at one point thereon in the groove 8a. This construction is such that engagement of the disc 12 in the groove 8a will prevent raising of the lid 5.

To make the above described latch means releasable to permit raising of the lid 5, the marginal portion of the disc 12 is cut away at one point to form a notch 12a. When the operating handle 7 is turned to a suitable position, the notch 12a will be aligned with the stud 8 so that no portion of the disc 12 will then be disposed within the groove 8a of the stud 8. Obviously, latching co-operation will not exist at such time between the disc 12 and stud 8 and accordingly the lid 5 of the hood H will be free for raising of the lid 5. To assist in holding the handle 7 and disc 12 in normal latching position a resilient element 13 is provided, one end of which is adapted to engage the end of a second notch 12b formed in the peripheral portion of the disc 12. The shape of the notch 12b is such that portions of the disc 12 defining the same will cam the element 13 out of the notch 12b when the handle 7 is turned out of its normal position.

The above described construction is of conventional form and does not constitute any portion of my invention.

The disclosed apparatus comprising an embodiment of my invention is for the purpose of rendering the above described latch means unoperatable by means of the handle 7, except at such times as it is desired to permit access to the interior of the hood H and my apparatus is so arranged that it may be placed in condition to permit the usual operation of the latching means through turning of the handle 7.

The disc 12 is provided with a notch 14 additional to the notches therein previously described. The notch 14 is so shaped as to provide a shoulder 14a adapted for engagement thereof by suitable restraining means. The restraining means which I provide may consist of a resilient finger 15 anchored at one end thereof to a portion of the hood H which may be the rear edge portion of the flange 4a. The anchored end of the finger 15 may be secured to the flange 4a by any suitable means such as the rivets 16. The free end portion of the finger 15 is increased in width upwardly so as to provide an element 15a disposed at the same level as the latch disc 12. The outer end of the finger 15 is bent rearwardly to form an abutment element 15b adapted for engagement with the shoulder 14a of the disc 12. The finger 15 is so tensioned as to bear at its outer end radially inwardly of the disc 12 so that positioning of the disc 12 in its normal or latching position will result in the free end portions 15a and 15b of the finger 15 springing into the notch 14 of the disc 12 so that the abutment element 15b of the finger 15 may abut the shoulder 14a to prevent rotation of the disc 12 toward its non-latching position.

I provide means located within the interior of the automobile A and preferably conveniently accessible to the driver of the vehicle for withdrawing the finger 15 from engagement with the shoulder 14a when it is desired to permit unlatching of the lid 5 for raising of the same. To this end, I provide a tubular member 16, preferably mounted in the instrument panel 17 of the automobile and containing a plunger 18 carrying a handle or button 18a on the rearward end thereof. The tubular element 16 within which the plunger 18 is longitudinally slidable has a longitudinal slot 16a therein and a short circumferentially extending slot 16b located at the inner end of and connected with the longitudinal slot 16a. The plunger 18 is provided with a pin 18b extending diametrically therethrough and having an outwardly projecting portion working in the slots 16a and 16b. An elongated element 19, preferably of a flexible nature and which may consist of a cable or wire, is attached to the forward end of the plunger 18. The forward or remaining end of the flexible element 19 is connected to the finger 15 by means of securing the same in a suitable aperture formed in the rearwardly bent portion 15b of the finger 15. Obviously, pulling the control handle 18a rearwardly will communicate such motion to the finger 15 through the flexible element 19 and will act to pull the abutment element 15b of the finger 15 out of engagement with the shoulder 14a of the disc 12, whereafter the disc 12 is free to be operated by the control handle 7 for placement in non-latching position. To hold the finger 15 out of engaging relation with the disc 12, the plunger 18 may be pulled rearwardly to its limit of movement and rotated through a slight angle to position the pin 18b in the short circumferential slot 16b, whereby the plunger 18b will be retained in its rearwardly displaced position.

The driver of an automobile equipped with my above described hood-locking apparatus would normally leave the device in locking position, that is with the abutment element 15b of the finger 15 disposed in the notch 14 of the disc 12 and engaging the shoulder 14a. When the car is left unattended, most drivers lock the doors of the vehicle, thus rendering the control handle 18a inaccessible to any person contemplating unauthorized access to the interior of the hood H. All of the remaining parts of my device are contained within the interior of the hood H and are, of course, inaccessible when the hood H is locked by means of my device. When the user of an automobile desires that the operating handle 7 be free for operation to unlatch the lid 5, he may, of course, accomplish this purpose as previously explained.

It is apparent that I have invented a novel, simple, compact and reliable device for locking the hood of an automobile and rendering the usual exteriorly accessible hood latch operating means inoperative and operative as desired.

It will, of course, be understood that various changes may be made in the form, details, arrangement and proportions of the various parts without departing from the scope of my invention.

What is claimed is:—

1. In combination with an automobile having a hood including a lid portion horizontally hinged at its rear end to a main hood portion so as to be upwardly and rearwardly swingable relative thereto and provided with a latch at the forward end of said lid portion including an element rotatable in response to manipulation of means situated on the exterior of said lid portion for setting and releasing said latch, a shoulder formed on said element facing circumferentially thereof in the direction of latch-releasing movement thereof, a stop element shiftable into and out of engagement with said shoulder when said latch is engaged, means yieldably urging said stop element toward its shoulder-engaging position, an operating element situated within said automobile and accessible to a driver thereof, and connection means between said operating element and said stop element whereby said operating element may be manipulated to effect withdrawal of said stop element from engagement with said shoulder.

2. In combination with an automobile having a hood including an upwardly and rearwardly swingable lid carrying a latch element rotatable into and out of engagement with an element fixedly mounted on a main portion of said hood responsive to manipulation of means situated exteriorly of said lid, means for normally preventing rotation of said rotatable element out of engagement with said fixed element comprising, a shoulder formed on said rotatable element facing circumferentially thereof in the direction of latch-releasing movement thereof, a stop element shiftable generally radially of said rotatable element into and out of engagement with said shoulder when said rotatable element is engaged with said fixed element, means yieldably urging said stop element toward its position of engagement with said shoulder, and operating means accessible to a driver of said automobile connected to said stop element so that said stop element may be withdrawn from engagement with said shoulder by suitably manipulating said operating means.

3. In combination with an automobile having a hood including a lid portion horizontally hinged at its rear end to a main hood portion so as to be upwardly and rearwardly swingable relative thereto and provided with a latch at the forward end of said lid portion including a disc rotatable in response to manipulation of means situated externally of said hood for setting and releasing said latch, a shoulder formed on the peripheral portion of said disc facing circumferentially thereof in the direction in which said disc is rotated in releasing said latch, a resilient stop element disposed generally tangentially of said disc in position for engagement of one end of said stop element with said shoulder when said disc is in latching position to restrain said disc from rotation out of latching position, the remaining end of said stop element being rigidly mounted on said lid portion and said stop element being tensioned to normally remain in engagement with said shoulder, a shiftable control element within said automobile and accessible to a driver thereof, and actuating connections between said control element and said stop element whereby said control element may be manipulated to cause flexing of said stop element out of engagement with said shoulder.

4. In combination with an automobile having a hood including a lid portion horizontally hinged at its rear end to a main hood portion so as to be upwardly and rearwardly swingable relative thereto and provided with a latch at the forward end of said lid portion including an element rotatable in response to manipulation of means situated on the exterior of said lid portion for setting and releasing said latch, a shoulder formed on said element by providing a suitably shaped notch therein whereby a portion of said element partially defining said notch constitutes said shoulder, said shoulder facing circumferentially of said element in the direction of latch-releasing movement thereof, a stop element shiftable into and out of engagement with said shoulder when said latch is engaged, means yieldably urging said stop element toward its shoulder-engaging position, an operating element situated within said automobile and accessible to a driver thereof, and connection means between said operating element and said stop element whereby said operating element may be manipulated to effect withdrawal of said stop element from engagement with said shoulder.

HILBERT J. NYHUS.